United States Patent [19]

Aoyagi et al.

[11] Patent Number: 4,793,689
[45] Date of Patent: Dec. 27, 1988

[54] LENS BARREL WITH VIBRATION WAVE MOTOR

[75] Inventors: Masao Aoyagi, Yokohama; Shigeru Kamata, Tokyo; Ryuji Suzuki, Kawasaki, all of Japan

[73] Assignee: Canon Kabushiki Kaisha, Tokyo, Japan

[21] Appl. No.: 945,479

[22] Filed: Dec. 23, 1986

[30] Foreign Application Priority Data

Dec. 26, 1985 [JP] Japan .................. 60-200433[U]
Dec. 27, 1985 [JP] Japan .................. 60-204708[U]

[51] Int. Cl.$^4$ .................. G02B 7/02; G02B 15/00; H01L 41/04; G03B 9/02
[52] U.S. Cl. .................. 350/255; 350/429; 310/323; 310/317; 354/271.1
[58] Field of Search .......... 350/255, 252, 429; 310/323, 328, 317; 354/271.1, 195.1, 400; 369/44, 45

[56] References Cited

U.S. PATENT DOCUMENTS

| | | | |
|---|---|---|---|
| 4,504,760 | 3/1985 | Yamamoto et al. | 310/323 |
| 4,560,263 | 12/1985 | Katsuma et al. | 310/317 |
| 4,601,564 | 7/1986 | Yamamoto | 354/271.1 |
| 4,660,933 | 4/1987 | Notagashira et al. | 350/255 |

Primary Examiner—John K. Corbin
Assistant Examiner—Ronald M. Kachmarik
Attorney, Agent, or Firm—Fitzpatrick, Cella, Harper & Scinto

[57] ABSTRACT

A lens barrel includes a hollow rotary ring rotatable about the optic axis which is disposed within the hollow of a hollow fixed cylinder with a bearing interposed therebetween, a moving cylinder movable in response to rotation of the rotary ring which is disposed within the hollow of the rotary ring, a vibration wave motor which is disposed between the diametrical directions of the fixed cylinder and the rotary ring, and a rotor which is substantially secured to the rotary ring.

15 Claims, 2 Drawing Sheets

LENS BARREL WITH VIBRATION WAVE MOTOR

BACKGROUND OF THE INVENTION

1. Field of the Invention

This invention relates to a lens barrel using a vibration wave motor as a drive source.

2. Related Background Art

Numerous lens barrels having incorporated therein a motor for the focusing and magnification changing operations of a focus lens or a zoom lens and effecting the driving of the motor by an electrical signal from focus detecting means or zoom control means are known. The motors incorporated in the prior-art lens barrels are iron core motors, coreless motors or brushless motors in which a coil is wound on an iron core and a rotary shaft is fixed to the iron core, so-called solid type motors in which a rotary shaft is fixed to a permanent magnet and a coil without an iron core is wound around the permanent magnet, or hollow type motors according to the applicants previous patent application (U.S. Application Ser. No. 688,365) in which the rotor portion and stator portion of a motor are of a hollow structure. Further, stepping motors are also known as motors of a hollow structure.

The above-mentioned conventionally used solid type motors and hollow type motors are of a structure utilizing a rotational movement based on an electromagnetic action and suffer from various problems in the rotation of the rotor.

One of the problems is that there are vibrations during the rotation of the rotor and in the case of a lens barrel for a single lens reflex camera or a lens barrel for a lens or shutter camera, those vibrations cause the camera to assume vibrations of the camera which in turn cause out-of-focus state.

Also, these vibrations involve vibration noise which diminishes the photographer's pleasure in taking pictures.

Further, the aforementioned electromagnetic motors require a reduction gear train for controlling the rotational speed and rotational torque of the rotor, and the incorporation of the reduction gear train into the lens barrel results in the complicated structure of the lens barrel, an increased number of parts and a complicated process of assembly, which in turn greatly affects the cost.

SUMMARY OF THE INVENTION

It is a primary object of the present invention to provide a lens barrel which uses a vibration wave motor as a drive source for driving a focus lens, a zoom lens or the like, thereby solving the problems of vibrations, noise and a complicated barrel structure.

Other objects of the present invention will become apparent from the following detailed description.

DESCRIPTION OF THE PREFERRED EMBODIMENT

Figure 1:
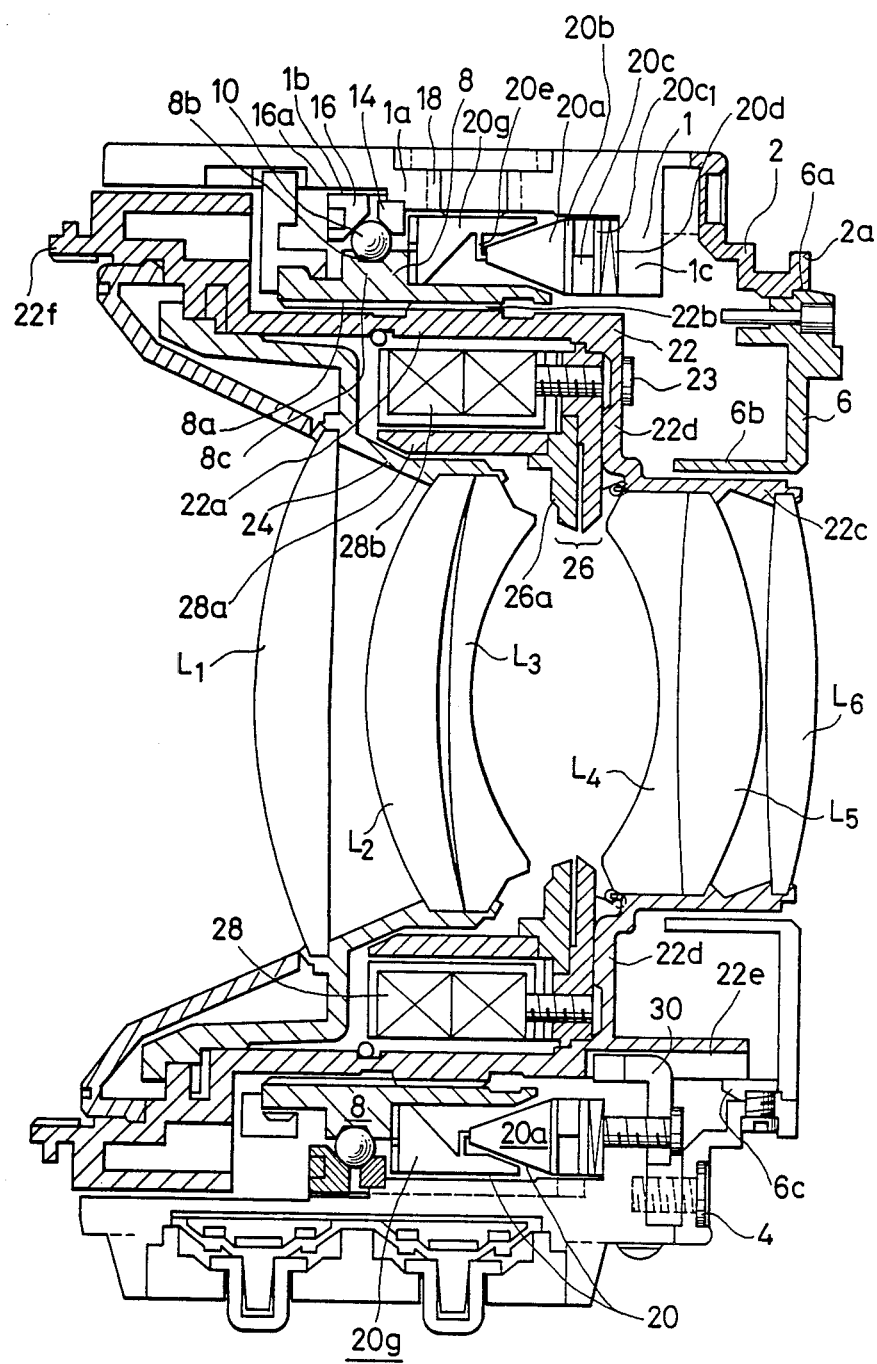
FIG. 1 is a central cross-sectional view of a lens barrel according to an embodiment of the present invention.

FIG. 1 is a cross-sectional view of an embodiment of the lens barrel of the present invention. In FIG. 1, reference numeral 1 designates a fixed cylinder to the rear end of which a bayonet ring 2 is fixed by means of screws 4.

Denoted by 2a is the bayonet pawl of the bayonet ring 2. Reference numeral 6 designates a mount lid member having a disc portion 6a and a cylinder portion 6b integrally molded with the bore thereof by the use of resin molding.

The mount lid member 6 also has a plurality of engaging pawls 6c protruding rearwardly from the outer periphery of the disc portion 6a and integrally molded with one another, and these engaging pawls 6c are fixed by being fitted into engagement grooves or holes formed in the bayonet ring 2 by the utilization of the elasticity of the resin.

Reference numeral 8 denotes a rotary ring having a helicoid 8a provided on the inner peripheral surface thereof, and a ring-like protrusion 8c formed with a ball race 8b in which bearing balls 10 rotate is provided on the outer periphery thereof.

Reference numerals 14 and 16 designate ball retaining rings which retain the balls 10 and cooperate with the ring-like protrusion 8c of the rotary ring 8 to form a bearing portion.

The ball retaining ring 14 has in the outer periphery thereof an engagement groove or hole engaged by a projection 1a formed on the inner periphery of the fixed cylinder 1, and an inclined surface for retaining the balls 10 is formed on the bore thereof.

The ball retaining ring 16 has on the outer periphery thereof a threaded portion 16a threadably engaged with a threaded portion 1b formed on the inner periphery of the fixed cylinder 1, and an inclined surface for retaining the balls 10. Dots-and-dash line 18 indicates the position at which a movement amount detecting device is disposed. An ultrasonic wave motor 20 for rotating and driving the rotary ring 8 is disposed between the rotary ring 8 and the fixed cylinder 1.

The ultrasonic wave motor 20 comprises a rotor portion and a stator portion. The stator portion comprises a vibratory member 20a, a piezo-electric element 20b secured to the vibratory member 20a, felt 20c, a felt holding member $20c_1$, and a spring member 20d; and the rotor portion consists of a friction member 20e and a rotary member 20g which is a connecting member to the rotary ring 8. The stator portion is fitted in the fixed cylinder 1 with a clearance with respect to the inner periphery thereof, and further, the ball retaining ring 16 is screwed into the threaded portion 1b of the fixed cylinder 1 with the ball retaining ring 14 and the balls 10 interposed therebetween, whereby the ultrasonic wave motor 20 is held with the spring member 20d urged against the surface of the flange-like protrusion 1c of the fixed cylinder 1.

Reference numeral 22 denotes a movable cylinder. The movable portion 22, as shown in FIG. 1, has a cylinder portion 22a, a helicoid portion 22b threadably engaged with the helicoid 8a of the rotary ring 8, a lens holding frame portion 22c for holding a lens L, a wall portion 22d connecting the cylinder portion 22a and the lens holding frame portion 22c, a key way 22e provided in that portion of the cylinder portion 22a which extends toward the camera body, and a mounting portion 22f for mounting accessories such as a filter, etc. which is a cylinder portion extending from the cylinder portion 22a toward the object to be photographed and protruding in a radial direction relative to the optic axis $O_1$. Reference numeral 24 designates a lens holding ring for holding lens groups $L_1$–$L_3$. The lens holding ring 24 is fixed to the helicoid cylinder 22.

Reference numeral 26 denotes a diaphragm unit, and reference character 26a designates a diaphragm blade opening-closing ring which is integrally coupled to the rotor 28a of an electromagnetic motor 28. Designated by 28b is a stator for driving the rotor 28a. The diaphragm unit 26 and the motor 28 are fixed to the helicoid cylinder 22 by means of a screw 23.

The operation of the lens barrel constructed as shown in FIG. 1 will now be described.

When the lens barrel shown in FIG. 1 is mounted on a camera, the autofocus device on the camera side operates to drive the ultrasonic wave motor 20. Rotation of the rotary member 20g of the motor 20 causes the rotor ring 8 connected to the rotary member 20g to rotate about the optic axis. Since the rotary ring 8 is threadably engaged with the cylinder 22 and a key member 30 fixed to the fixed cylinder 1 is engaged with the key way 22e of the cylinder 22, the cylinder 22 is moved in a direction parallel to the optic axis by the rotation of the rotary member 20g while holding the lenses $L_1$–$L_6$, whereby in-focus-control is accomplished.

On the other hand, exposure control is accomplished in such a manner that when the exposure control device on the camera side operates and electric power is supplied to the stator 28b the rotor 28a is rotated and the integrally coupled diaphragm blade opening closing ring is rotated therewith and the conventional diaphragm blades are controlled to a proper exposure aperture value.

Another embodiment will now be described.

Figure 2:
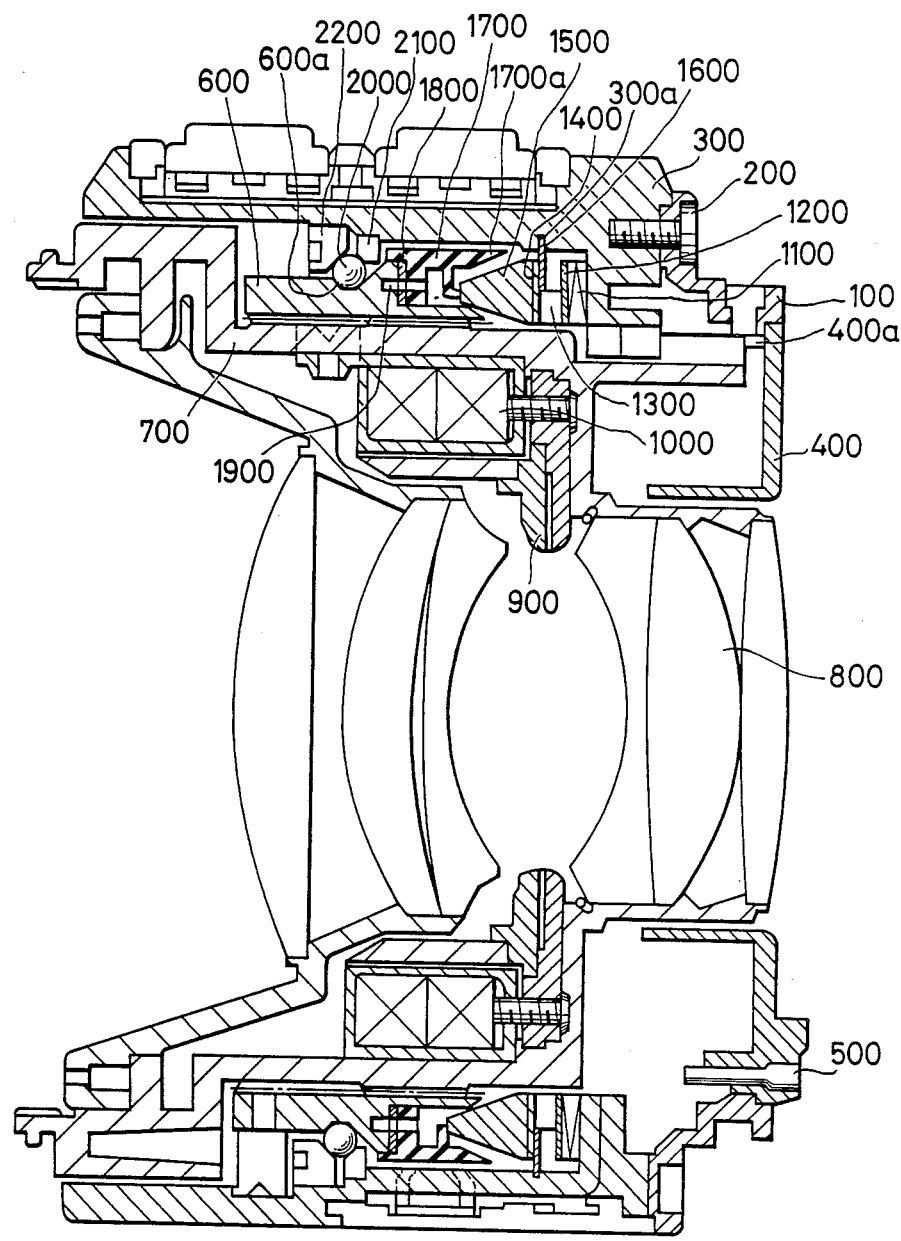
FIG. 2 is an enlarged view showing the essential portions of another example of the construction of the ultrasonic wave motor portion of FIG. 1.

FIG. 2 shows the structure of the lens of another embodiment when the vibration wave motor is applied to an interchangeable lens for a single lens reflex camera. In FIG. 2, reference numeral 100 designates a mount mounted on the lens mounting portion of the camera body, not shown, reference numeral 200 denotes a fixing screw, and reference numeral 300 designates a fixed cylinder integrally coupled to the mount 100 by means of the fixing screw 200. Reference numeral 400 denotes a back lid resiliently coupled to the mount 100 by means of a resilient portion 400a.

Reference numeral 500 designates a plurality of contacts for effecting signal exchange with the camera body, not shown. Reference numeral 600 denotes a rotary cylinder having a rotary helicoid screw rotated by a vibration wave motor which will be described later, and reference numeral 700 designates a rectilinear cylinder threadably engaged with the rotary helicoid screw.

When the rotary cylinder 600 is rotated by the vibration wave motor which will be described later, a lens portion designated by 800 in the rectilinear cylinder 700 moves rectilinearly, whereby focus adjustment is accomplished. The rectilinear cylinder 700 has a diaphragm unit 900, which also moves rectilinearly with the lens portion 800. Reference numeral 1100 designates a counter-sunk spring for effecting frictional engagement between a vibratory member and a moving member, both to be described. The counter-sunk spring 1000 is inserted in the fixed cylinder 300. The counter-sunk spring 1100 urges a rotary member 1500 comprising a resilient member against a rotor 1700 through a washer 1200, felt 1300 as a vibration absorbing member, and an electro-strictive element 1400 as an electro-mechanical energy converting element secured to the back of the vibratory member 1500. The electro-strictive element 1400 is arranged with a phase difference in a conventional manner. The element 1400 may be polarized into a plurality of states in the fashion of phase difference. A terminal 1600 is connected to the electro-strictive element 1400 jointed to the annular vibratory member 1500 of trapezoidal cross-sectional shape, and voltages having a 90° phase difference are applied through a lead line 1600 to generate a travelling vibration wave in the vibratory member 1500 in a conventional manner. A rotor 1700 as a moving member having a flange portion 1700a is integrally coupled to the rotary cylinder 600 by a rubber ring 1800 and a pin 1900, and the rotor 1700 is rotated by the travelling vibration wave generated in the vibratory member 1500, whereby the rotary cylinder 600 is rotated with the moving member 1700.

A V-shaped groove 600a is formed in the rotary cylinder 600, and the V-shaped groove 600a holds a plurality of balls provided on the circumference with the aid of a ball receiver 2100 fitted to the fixed cylinder 300 and a ball keeper 2200 threadably engaged with the fixed cylinder 300, thereby decreasing the friction resistance of the rotary cylinder 600 and smoothing the rotation thereof. The rotary member 1500 biased in the direction of the optic axis by countersunk spring 1100 is in pressure contact with the moving member 1700 having the flange portion 1700a and the moving member 1700 is frictionally driven by the travelling vibration wave generated by the vibratory member 1500.

The vibration absorbing member 1300 is formed of rubber, felt or like material and has the effect of not transmitting mechanical vibration to the fixed cylinder 300 and not attenuating the vibration of the underside of the vibratory member 1500. The washer 1200 serves to uniformly transmit the spring force of the countersunk spring 1100 to the vibratory member 1500.

In the above-described embodiment, the lens barrel could be made into a barrel structure suitable for drivingly controlling a focus lens (or a zoom lens) by an ultrasonic wave motor as an example of the vibration wave motor. As regards the connection between the vibratory member 20a and rotary member 20g which together constitute the ultrasonic wave motor, it is necessary that the contact between rotary contact portions 20–20g be held under a predetermined contact pressure, and according to the present embodiment, they are held so as to be sandwiched by and between the radially extending flange-like protrusion 1c of the fixed cylinder 1 fixed to the ultrasonic wave motor 20 and bearing members 14, 16 fastened to the fixed cylinder 1 and therefore, the pressure contact between the rotary member and the vibratory member is ensured by the spring force of a spring member 20d and revolution of the ultrasonic wave motor is accomplished smoothly.

Also, in the above-described embodiment, the diaphragm unit 26 is drivingly controlled by the electromagnetic motor 28 and therefore, as compared with the prior-art system in which the diaphragm unit is driven by a spring force, space efficiency can be enhanced. That is, the prior-art system has required various lever constructions for ensuring the mechanical operative association with a camera, whereas in the present embodiment, the operative association with a camera only requires electrical communication and therefore, the above-mentioned various lever constructions can be eliminated.

Also, the vibration wave motor 20 (ultrasonic wave motor) in the present embodiment is constructed in the shape of a hollow ring and therefore, the location at which the rotary ring 8 is secured to the rotary member 20g as the rotary member of the motor can be formed circumferentially in a large area to thereby reduce the transmission load, and the eccentric biasing in the rotation of the rotary ring 8 itself (if the rotary ring is rotated and driven at a single securing location, a biasing force in the eccentric direction acts toward the center from the securing location) is eliminated, thus enabling smooth rotation.

Also, in the present embodiment, the hollow ring-like vibration wave motor (ultrasonic wave motor) is disposed in the space for the construction of the bearing of the fixed cylinder 1 and rotary ring 8, i.e., the radial space between the fixed cylinder 1 and the rotary ring, and therefore, the diametrical enlargement of the lens barrel by the incorporation of the vibration wave motor 20 does not substantially occur, and this leads to the provision of a compact lens barrel with a motor incorporated therein.

Further, in the present embodiment, the vibration wave motor 20 (ultrasonic wave motor) is disposed within the area of the length of the movable cylinder 22 in the direction of the optic axis and therefore, the enlargement of the lens barrel itself in the direction of the optic axis does not occur.

Also, in the lens barrel according to the present embodiment, the fixed cylinder 1 alone is the cylinder member positioned on the outermost side and therefore, even if the user manually holds the outer periphery of the lens barrel at any location thereon, it will not hamper the revolution of the vibration wave motor 20 (ultrasonic wave motor).

Further, the vibration wave motor (ultrasonic wave motor) in the present invention is disposed relative to the optic axis with the stator side being near the mount and therefore, electrical connections for the electrical communication with a camera, for example, a flexible printed substrate and lead wires, can be disposed easily.

The vibration wave motor (ultrasonic wave motor) in the above embodiment has been described as a drive source for focus operation, but of course, can also be used as a drive source for zoom operation, diaphragm operation, change-over from normal photography to macrophotography, etc.

What is claimed is:

1. A lens barrel comprising:
a hollow fixed cylinder;
a hollow rotary ring disposed within the hollow of said fixed cylinder;
bearing means disposed radially between said fixed cylinder and said rotary ring, said rotary ring being rotatable around the optical axis of the lens barrel;
a moving member disposed within the hollow of said rotary ring, said moving member being movable in response to rotation of said rotary ring; and
a vibration wave motor comprising a rotary member and disposed radially between said fixed cylinder and said rotary ring, said rotary member of said motor being substantially secured to said rotary ring, and said rotary ring being rotated by said motor.

2. A lens barrel according to claim 1, wherein said fixed cylinder is an outermostly exposed outer cylinder.

3. A lens barrel according to claim 1, wherein said moving member is formed by a cylindrical member.

4. A lens barrel according to claim 3, wherein said rotary ring and said cylindrical moving member are helicoid-coupled, and said moving member is movable in the direction of the optical axis in response to rotation of said rotary ring.

5. A lens barrel according to claim 4, further comprising a lens holding frame member secured to said moving member.

6. A lens barrel according to claim 4, further comprising a diaphragm unit disposed within the hollow of said moving member, and an electromagnetic motor for controlling the diaphragm.

7. A lens barrel according to claim 1, wherein said vibration wave motor further comprises:
a piezo-electric element performing an electro-strictive action in response to receiving a voltage;
a vibratory member receiving the electro-strictive action of said piezo-electric element; and
said rotary member rotatable in response to the vibration of said vibratory member.

8. A lens barrel according to claim 7, wherein said vibration wave motor is an ultrasonic wave motor.

9. A lens barrel according to claim 7 wherein said vibration wave motor further comprises a stator portion and said lens barrel further comprises a spring member, wherein the stator portion of said vibration wave motor including said piezo-electric element and said vibratory member is urged against and held on said fixed cylinder by said spring member.

10. A lens barrel, comprising:
a hollow fixed cylinder;
a hollow rotary ring rotatable around the optical axis of the lens barrel and disposed within the hollow of said fixed cylinder;
bearing means interposed between said fixed cylinder and said rotary ring;
a moving member disposed within the hollow of said rotary ring, said moving member being movable in response to rotation of said rotary ring; and
a vibration wave motor comprising a rotary member, wherein said vibration wave motor is disposed radially between said fixed cylinder and said rotary ring, said rotary member of said vibration wave motor being substantially secured to said rotary ring, said rotary ring being rotated by said motor, wherein said bearing means is disposed radially between said fixed cylinder and said rotary ring at a distance from said vibration wave motor in the direction of the optical axis.

11. A lens barrel according to claim 10, wherein said bearing means comprises a ball bearing, and wherein said lens barrel further comprises a ball race provided on said rotary ring to receive said ball bearing.

12. A lens barrel according to claim 10, further comprising helicoids formed on the inner periphery of said rotary ring and the outer periphery of said moving member, wherein said rotary ring and said moving member are helicoid-coupled to each other by the helicoids formed on the inner periphery of said rotary ring and the outer periphery of said moving member.

13. A lens barrel according to claim 10, further comprising a diaphragm unit disposed within the hollow of said moving member, and an electromagnetic motor for controlling the diaphragm.

14. A lens barrel, comprising:
a hollow fixed cylinder;

a hollow rotary ring rotatable around the optical axis of the lens barrel and disposed within the hollow of said fixed cylinder;

bearing means disposed radially between said fixed cylinder and said rotary ring;

a moving member disposed within the hollow of said rotary ring, said moving member being movable in response to rotation of said rotary ring; and a vibration wave motor radially disposed between said fixed cylinder and said rotary ring, comprising:
 a piezo-electric element performing an electro-strictive action in response to the application of a voltage thereto;
 a vibratory member receiving the electro-strictive action of said piezo-electric element; and
 a rotary member rotatable in response to the vibration of said vibratory member, wherein said vibration wave motor is a hollow ring-link block wherein said rotary member has a ring-link configuration, and wherein said rotary ring and said rotary member are substantially secured to each other along almost the entire peripheral surfaces thereof.

15. A lens barrel, comprising:

a hollow fixed cylinder;

a hollow rotary ring disposed within the hollow of said fixed cylinder;

bearing means disposed radially between said fixed cylinder and said rotary ring, said rotary ring being rotatable around the optical axis of the lens barrel;

a cylindrical moving member disposed within the hollow of said rotary ring and helicoid-coupled with said rotary ring, said cylindrical moving member being movable in response to the rotation of said rotary ring;

a vibration wave motor comprising a rotary member, wherein said vibration wave motor is radially disposed between said fixed cylinder and said rotary ring, said vibration wave motor being disposed on the outer peripheral side of said cylindrical moving member so that said cylindrical moving member and said vibration wave motor overlap each other in the radial direction, wherein said rotary member is substantially secured to said rotary ring, and said rotary ring is rotated by said motor; and a lens holding frame member secured to said cylindrical moving member.

* * * * *

UNITED STATES PATENT AND TRADEMARK OFFICE
CERTIFICATE OF CORRECTION

PATENT NO. : 4,793,689

DATED : December 27, 1988

INVENTOR(S) : Masao Aoyagi, et al.

It is certified that error appears in the above-identified patent and that said Letters Patent is hereby corrected as shown below:

COLUMN 1

Line 14, "focus" should read --a focus--.

COLUMN 2

Line 24, "rotate is" should read --rotate. Protrusion 8C is--.
Line 25, "thereof." should read --of ring 8.--.
Line 47, "felt 20C," should read --a felt 20C,--.

COLUMN 3

Line 32, "stator 28b" should read --stator 28b,--.
Line 33, "opening closing" should read --opening-closing--.
Line 66, "1000" should read --1100--.

COLUMN 4

Line 49, "20-20g" should read --20e-20g--.

UNITED STATES PATENT AND TRADEMARK OFFICE
CERTIFICATE OF CORRECTION

PATENT NO. : 4,793,689

DATED : December 27, 1988

INVENTOR(S) : Masao Aoyagi, et al.

It is certified that error appears in the above-identified patent and that said Letters Patent is hereby corrected as shown below:

COLUMN 5

Line 51, "lens barrel" should read -- lens barrel,--.

COLUMN 7

Line 18, "block" should read --block,--.

Signed and Sealed this

Fourth Day of July, 1989

Attest:

DONALD J. QUIGG

Attesting Officer     Commissioner of Patents and Trademarks